United States Patent
Ringering et al.

(10) Patent No.: US 7,974,822 B2
(45) Date of Patent: Jul. 5, 2011

(54) METHOD AND DEVICE FOR DETERMINING THE LIFE EXPECTANCY OF COMPONENTS WHILE IN OPERATION

(75) Inventors: Walter Ringering, Partenstein (DE); Gerhard Schwaab, Gerolzhofen (DE); Matthias Wahler, Muedesheim (DE)

(73) Assignee: Robert Bosch GmbH, Stuttgart (DE)

( * ) Notice: Subject to any disclaimer, the term of this patent is extended or adjusted under 35 U.S.C. 154(b) by 317 days.

(21) Appl. No.: 12/182,298

(22) Filed: Jul. 30, 2008

(65) Prior Publication Data

US 2009/0089033 A1 Apr. 2, 2009

(30) Foreign Application Priority Data

Aug. 17, 2007 (DE) .................. 10 2007 038 890

(51) Int. Cl.
*G06F 9/00* (2006.01)
*G01P 15/00* (2006.01)
(52) U.S. Cl. .............. 703/7; 702/34; 702/141; 180/65.2
(58) Field of Classification Search .................. 703/2, 7; 702/34, 141, 138; 180/65.2
See application file for complete search history.

(56) References Cited

U.S. PATENT DOCUMENTS

| 5,680,025 A * | 10/1997 | Bowers et al. ................ 318/806 |
| 2004/0055398 A1 | 3/2004 | Weyer et al. |
| 2006/0106549 A1 * | 5/2006 | Olsson ............................ 702/34 |
| 2007/0284162 A1 * | 12/2007 | Zettel et al. .................. 180/65.2 |
| 2008/0208516 A1 * | 8/2008 | James ........................... 702/141 |

FOREIGN PATENT DOCUMENTS

| DE | 100 39 015 | 1/2002 |
| DE | 10 2004 048 649 | 4/2006 |
| DE | 10 2005 032 720 | 1/2007 |
| EP | 1 598 569 | 11/2005 |
| WO | 2006/127870 | 11/2006 |

* cited by examiner

*Primary Examiner* — Thai Phan
(74) *Attorney, Agent, or Firm* — Michael J. Striker

(57) ABSTRACT

In a method for determining the life expectancy of machine components (2) during operation, characteristic data are established in order to determine the life expectancy for the relevant machine component (2), loads acting on the machine part (2) during operation are determined by means of a sensor device (10), characteristic values that are characteristic for the loads acting on the machine component (2) are determined, and the life expectancy is determined based on the characteristic values and on the characteristic data for the machine component (2).

11 Claims, 1 Drawing Sheet

METHOD AND DEVICE FOR DETERMINING THE LIFE EXPECTANCY OF COMPONENTS WHILE IN OPERATION

BACKGROUND OF THE INVENTION

The following invention relates to a method and device for determining the life expectancy of machine components while in operation. The present invention is described with reference to the life expectancy of ball screw drives (BSD); it should be noted, however, that the invention can also be used for other machine components such as linear guides, bearings, and the like.

In the use of it machine components, it is desirable to be able to predict or estimate their life expectancy in order, for example, to be able to carry out a replacement of the relevant machine component at an appropriate time.

It is known from the prior art to carry out the life expectancy of machine components with the aid of theoretical load cycles while machines are being constructed. The life expectancy of the machine elements is determined only theoretically and as a result, stresses, which diverge from this in reality and lead to a premature or accelerated deterioration, are not taken into account. In other words, the life expectancy calculations and therefore also the necessary selection of a particular screw drive are based on theoretical assumptions about the load cycle and types of operation. The life expectancy can be calculated as a number of rotations or can be calculated in operating hours and constitutes the basis for the selection of a screw drive.

SUMMARY OF THE INVENTION

The object of the present invention, therefore, is to determine the life expectancy of machine components by also taking into account the real stresses acting on the component.

This is achieved according to the invention by a method as recited in claim 1 and a device as recited in claim 9. Advantageous embodiments and modifications are the subject of the dependent claims.

In a method according to the invention for determining the life expectancy of machine components while in operation, characteristic data are established in order to determine the life expectancy for this relevant machine component. Furthermore, a sensor unit is used for determining loads acting on the machine component during operation, determining characteristic values that are characteristic for the loads acting on the machine component, and determining the life expectancy based on the characteristic values and on the characteristic data for the machine component.

The expression "machine components while in operation" is understood to mean machine components that are currently being used in a certain machine and are therefore being subjected to loads. The "characteristic data for the relevant machine component" are understood in particular to be those data that contribute to determining the life expectancy of this machine component in use, e.g. the dynamic load rating C of the component, a static load rating, possibly spindle pitches, and the like.

Preferably, the life expectancy is a remaining life expectancy that is determined taking into consideration the portion of the machine component service life that has already elapsed. In other words, when determining the remaining life expectancy, the time that the machine component has already been in operation is subtracted.

Preferably, the sensor unit indirectly determines the loads acting on the machine component. This is understood to mean that preferably, it is not certain forces acting directly on the components that are measured, but instead, the life expectancy of the relevant machine element is calculated by means of the real measured load in the drive unit (and the previously input state variables). For example, it is possible based on the torque and speed of a corresponding drive unit to calculate the load acting on the machine component. It is also possible, for example, to determine the current flowing through a drive unit in order to be able to calculate the real measured load in the drive unit based on this. The calculation of the life expectancy therefore preferably occurs by means of the real measured load in the drive unit. The operator is provided with a display of the remaining life expectancy in order to thus optimize maintenance work, for example. Preferably, the state variables of the machine component that determine the life expectancy are also stored in the drive unit, thus permitting a long-term evaluation of the component.

Upon initial operation of the machine, the data of the one or more machine components are advantageously associated with the drive unit (as product data). During operation of the machine, the real loads of the machine elements are determined in the drive unit based on the state variables of the drive unit, preferably in an online fashion, thus permitting calculation of the remaining life expectancy of the machine elements.

The life expectancy of the relevant machine component is advantageously determined repeatedly, at various times. It is particularly advantageous for the life expectancy to be determined at fixed, predetermined time intervals over the entire operating duration of the machine component.

In another advantageous method, during the determination of a life expectancy at a predetermined later point in time, a life expectancy determined at an earlier point in time is taken into account. It would in principal also be possible for all prior measurement data to be taken into account with each new calculation. Particularly with life expectancy calculations that are carried out late in a service life, though, this would require the summation of a large number of individual summands. Consequently, instead of taking into account a summation of all summands, this advantageous method takes into account the life expectancy that was determined in the most recent step or in the step respectively preceding this one. As a result, it is not necessary to carry out a summation of a very large number of measurement values, but instead, it is only necessary to take into account the life expectancy determined in the preceding step together with the new measurement value obtained.

Preferably, the characteristic data for the machine component are determined upon initial operation of the machine component. This determination can occur based on actual measurements; it would also be possible, however, for the corresponding characteristic data to be taken, for example, from a data sheet furnished by the manufacturer of the machine component.

Preferably, the loads acting on the machine component are mechanical loads of the machine component. In another advantageous method, the machine components are taken from a group of machine components that includes bearings, ball screw drives, guides, in particular linear guides, and the like.

In another advantageous method, the characteristic data for the machine component are stored in a drive control unit of the machine. It is thus possible, for example, to store the data in the control unit that is associated, for example, with a motor. Consequently, in this method, in a first step, an implementation based on the integrated PLC in the drive unit is carried out. It would also be possible, however, to integrate the function of life expectancy calculation into a corresponding basic software in order to thus achieve a greater precision in the determination of the real load.

The present invention also relates to a device for determining the life expectancy of machine components; this device has a memory unit in which the characteristic data for the relevant machine component are stored. A processor device is also provided, which calculates the life expectancy of the machine component on the basis of the characteristic data stored in the memory unit. According to the invention, the device has a sensor device, which, during operation, determines a characteristic value for a load acting on the machine component and outputs a characteristic value that is characteristic for this load; the processor device is embodied so that it determines the life expectancy of the machine component by also taking into account this characteristic value.

In addition, the device according to the invention uses both data that characterize the machine component itself as well as those characteristic values that make it possible to draw conclusions about the load acting on the machine component.

Preferably, the processor device is embodied so that in determining the life expectancy, it also takes into account the portion of the machine component service life that has already elapsed. The invention described below is also based on a guide carriage equipped with a device of the type described above. Both the device according to the invention and the above-described method can be transferred in a modified form to intelligent guide carriages.

Other advantages and embodiments ensue from consideration of the accompanying drawing.

DETAILED DESCRIPTION OF THE DRAWINGS

Figure 1:
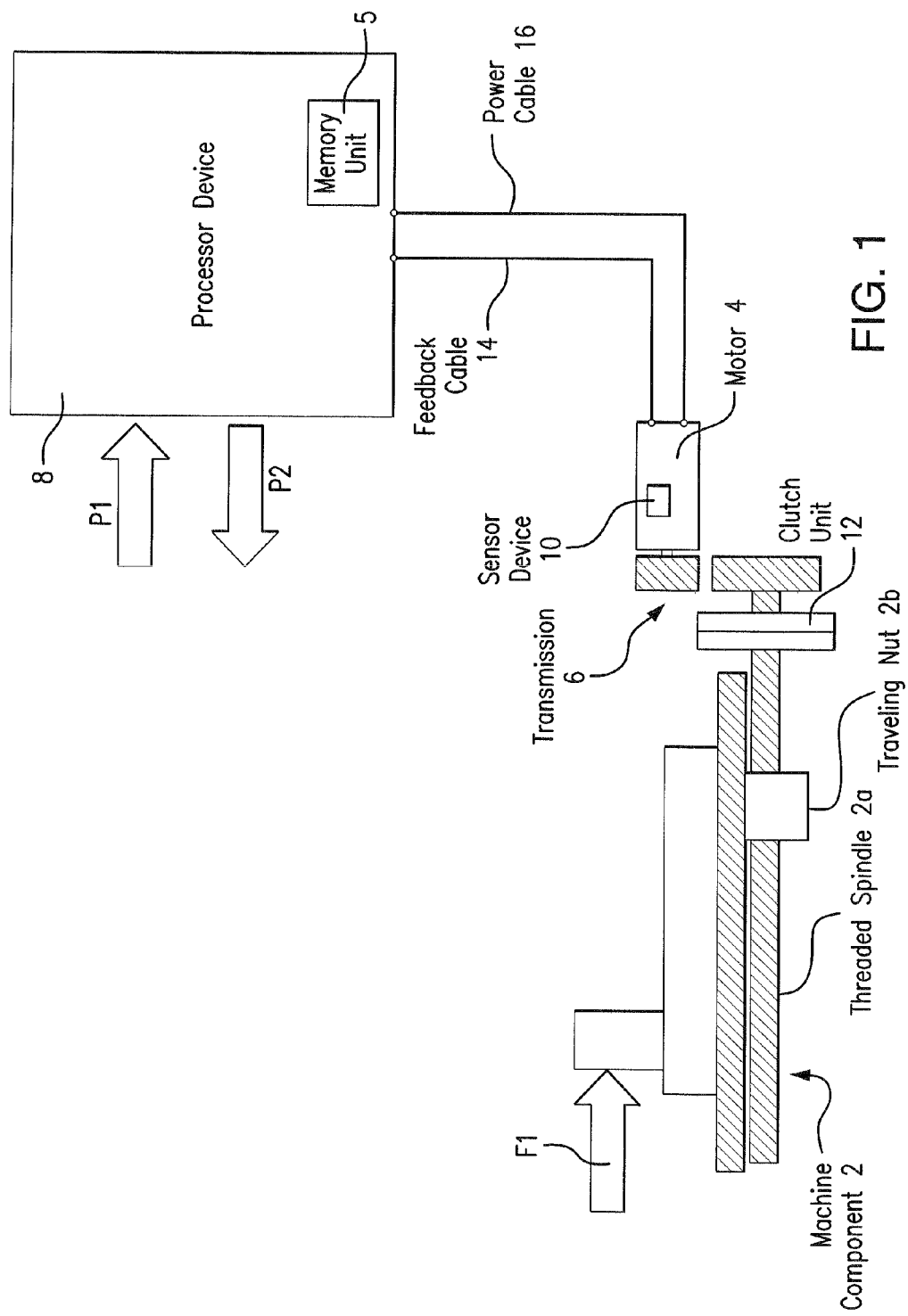
FIG. 1 shows a schematic block diagram for illustrating the present invention.

In FIG. 1, the reference numeral 2 refers to a machine component; in this instance, it is a screw drive composed of a threaded spindle 2a and a traveling nut 2b. A motor 4 drives this threaded spindle by means of a transmission 6 and possibly a clutch unit 12. In addition to a processing force F1, the BSD is also acted on by a friction force.

The motor 4 is a servo motor into which one or more sensor devices 10 are integrated. For example, these sensor devices 10 measure the current, which permits conclusions to be drawn as to the torque, stresses, or the like. The sensor device relays this information to a processor device 8 via a feedback cable 14. The reference numeral 16 refers to a power cable for supplying the servo motor 4.

The processor device 8 has a servo regulator equipped with an integrated drive unit PLC. In addition to the sensor data that are supplied via the feedback cable 14, specific data for the machine component 2, as mentioned at the beginning, are also input into to the processor device 8 (arrow P1). The processor device 8 also issues messages (arrow P2). These messages can, as mentioned above, be an indication of the remaining life expectancy of the BSD 2. The reference numeral 5 refers to a memory unit in which it is possible to store both the specific data for the machine component and the values output by the control unit.

The arrangement according to the invention permits users to determine the remaining life expectancy of the BSD 2 and also of linear guides and the like, with minimal inputs upon initial operation. The determination of the remaining life expectancy occurs as mentioned above based on real load values.

In general, the life expectancy of a BSD can be calculated using the following formula:

$$L_{10} = \left(\frac{C}{F_{equi,tot}}\right)^3 \cdot 10^6 \quad (1)$$

where $L_{10}$ refers to the life expectancy in rotations, the life expectancy being targeted at a 90% probability of survival. The parameter C refers to the so-called dynamic load rating of the machine component and is expressed in [N]. The parameter $F_{equi,\,tot}$ refers to the equivalent total load on the BSD, taking into account the prestressing force. The equivalent load is inferred from the theoretical cycle; this is done on the assumption that this cycle repeats and remains constant.

Preferably, the load on the BSD is determined continuously; this occurs, for example, through measurements taken from the torque values of the drive unit. In this way, a real life expectancy determination can be carried out on the basis of this continuous measurement.

By contrast with the theoretical determination of the life expectancy known from the prior art, an earlier wear on the screw drive (SD)—for example due to a real load that is actually higher than that in the theoretically assumed cycle—can be diagnosed, thus permitting preventive steps to be taken in order to maintain production. It is also possible to omit or postpone a planned replacement of the SD due to a load that is actually lower than that in the assumed cycle.

The calculation of the average load is based on a known cycle with a known load and also on the fact that this cycle repeats. The calculation is carried out using the following formula:

$$F_{equi} = \sqrt[3]{F_1^3 \cdot \frac{n_1}{n_m} \cdot \frac{q_1}{100} + F_2^3 \cdot \frac{n_2}{n_m} \cdot \frac{q_2}{100} + \ldots + F_n^3 \cdot \frac{n_n}{n_m} \cdot \frac{q_n}{100}} = \quad (2)$$

$$= \sqrt[3]{F_1^3 \cdot \frac{q_{s1}}{100} + F_2^3 \cdot \frac{q_{s2}}{100} + \ldots + F_n^3 \cdot \frac{q_{sn}}{100}}.$$

In this formula, $F_{equi}$ is the equivalent dynamic total load for the BSD and the entire travel cycle, including the taking into account of the prestressing force in the unit [N]. The parameter $F_{1-2-n}$ refers to the total load of the first through the second through the $n^{th}$ cycle component, including the prestressing force, likewise expressed in [N]. The parameter $n_{1-2-n}$ refers to the average speed in the above-mentioned first through the second through the $n^{th}$ cycle component, expressed in [rpm], and the parameter nm is the average speed, likewise expressed in [rpm].

The parameter $q_{1-2-n}$ refers to the time component of $1^{st}$-$2^{nd}$-$n^{th}$ force introduction, expressed in percent, and the parameter $q_{s1-s2-sn}$ refers to the path component after the $1^{st}$-$2^{nd}$-$n^{th}$ force introduction.

It is problematic, however, that for a load-dependent life expectancy, not the time component, but rather the time of the loads is known. Consequently, the calculation of the average axial load is preferably carried out based on rotation components at fixed time segments. These are preferably predetermined constant time segments after which the axial load is respectively determined. This calculation can be carried out in accordance with the following formula:

$$F_{equi} = \sqrt[3]{F_1^3 \cdot \frac{u_1}{u_{tot,n}} + F_2^3 \cdot \frac{u_2}{u_{tot,n}} + \ldots + F_n^3 \cdot \frac{u_n}{u_{tot,n}}} = \qquad (3)$$

$$= \sqrt[3]{F_1^3 \cdot \frac{n_1 \cdot t_a}{u_{tot,n}} + F_2^3 \cdot \frac{n_2 \cdot t_a}{u_{tot,n}} + \ldots + F_n^3 \cdot \frac{n_n \cdot t_a}{u_{tot,n}}}$$

In this case, $u_1$ refers to the rotations for the first force introduction, $u_{tot,n}$ refers to the total number of rotations after n phases, and $t_a$ refers to the measuring time for the force introduction; to be more precise, the torques or current values can be converted into the external force values on the BSD, expressed here in [rpm]. As has been explained above, torques or current values are measured with the aid of the sensor device. It would in principal also be possible to measure the load on the BSD 2 directly, with the aid of suitable force measurement devices.

In order to permit the most precise possible detection of the force introductions, it is necessary to select the shortest possible measuring time for $t_a$. Preferably, the time used is the shortest time in which all of the required parameters are available for the calculation.

Preferably, the measurements are carried out in chronological ranges of a few milliseconds. Since the life expectancy is on the order of several thousand hours, however, the above-mentioned formula (3) that calculates the life expectancy during operation would exceed the calculating power of the regulator because a service life of for example 1000 hours and a measuring time of one millisecond would require the addition of $3.6 \times 10^9$ numerical values.

It has therefore been proposed, as mentioned above, not to add all of the numbers, but rather only to add a value determined in a preceding step to the next measurement value. To be more precise, a preferable method is proposed with the following formula:

$$F_{equi} = \sqrt[3]{F_1^3 \cdot \frac{n_1 \cdot t_a}{u_{tot,n}} + F_2^3 \cdot \frac{n_2 \cdot t_a}{u_{tot,n}} + \ldots + F_n^3 \cdot \frac{n_n \cdot t_a}{u_{tot,n}}} \qquad (4)$$

$$= \sqrt[3]{Z(n)}.$$

In this case, $Z(n)$ refers to the intermediate value after n cycle steps and $F_{equi,n}$ refers to the equivalent dynamic load after n cycle steps. The description of the remaining parameters has already been given above.

Furthermore, the following formula applies to the total rotations:

$$u_{tot,x} = u_{tot,n} + t_a \cdot n_{n+1} + t_a \cdot n_{n+2} + \ldots + t_a \cdot n_x \qquad (5)$$

and for the intermediate value, the following equation also applies:

$$Z(x) = Z(n) \cdot \frac{u_{tot,n}}{u_{tot,x}} + F(n+1)^3 \frac{t_a \cdot n_{n+1}}{u_{tot,x}} + \qquad (6)$$
$$F(n+2)^3 \frac{t_a \cdot n_{n+2}}{u_{tot,x}} + \ldots + F(x)^3 \frac{t_a \cdot n_x}{u_{tot,x}}.$$

In these equations, $Z(x)$ refers to the intermediate value after x cycle steps (with x being greater than n). $F(x)$ refers to the total load of the x cycle component, including the taking into account of the prestressing force in [N], $n_x$ refers to the average speed of the $x^{th}$ cycle component in [rpm], and $u_{tot,x}$ refers to the total number of rotations after x phases.

Consequently, for the calculation of the remaining life expectancy, an image is calculated by means of the previous curve of the force load, this calculation preferably occurring at time intervals that amount to at least one hour.

The dynamic equivalent total load of the SD, including the taking into account of the prestressing force (after x cycle steps), yields the equation:

$$F_{equi,x} = \sqrt[3]{\sqrt{Z(x)}} \qquad (7).$$

In the following, the calculation of the life expectancy is described with the equivalent dynamic total load. The life expectancy here (also see formula 1) is calculated in accordance with the following equation:

$$L_{h,10} = \left(\frac{C}{F_{equi}}\right) \cdot \frac{10^6}{60 \cdot n_m}. \qquad (8)$$

As mentioned above, in this case, nm refers to the average speed for the entire cycle in [rpm].

The remaining life expectancy Lr of the SD is calculated in accordance with the following formula:

$$L_r = L_{h,10} - t_x \qquad (9).$$

In this case, the previously "used time" $t_x$ is calculated in accordance with the following equation:

$$t_x = x \cdot t_a \qquad (10).$$

In this case, x is a whole number and refers to the number of respective measurement steps.

In a preferred embodiment, the life expectancy calculation described above is integrated into the respective drive electronics along with warning messages. As mentioned above, the input data tables are likewise integrated into the control unit. Preferably, a corresponding device library can also be supplemented with a file card that describes the mechanical elements. Preferably, the user inputs characteristic data for the BSD such as the dynamic load rating C (in [N]), the static load rating Co (in [N]), the maximum speed [rpm], the spindle pitch [mm per rotation], the spindle length [mm], and possibly also the prestressing class; these data are associated with the specific machine component, for example by means of a material number.

Upon initial operation, the values associated with a certain machine component are taken from the corresponding file card and taken into account along with the drive unit. Thus the drive unit is associated with an SD or an LG, along with the data of the latter.

In the following, a description will be given of how the external axial load can be determined. This is carried out by means of the following formula:

$$F_{external,cycle\ segment} = \frac{2000 \cdot M_{BSD,cycle\ segment} \cdot \pi \cdot 0.9}{P}. \qquad (11)$$

where $F_{external}$ refers to the external force load on the BSD in the respective cycle segment, expressed in [N], and $M_{BSD}$ refers to the moment that acts on the BSD in the respective cycle segment, expressed in [Nm]. The parameter P refers to the spindle pitch, expressed in mm. If, as shown in FIG. 1, a transmission 6 with a reduction ratio is used, then this must also be taken into account in the calculation formulas.

The moment acting on the BSD in the respective time segments is calculated using the following formula:

$$M_{BSD, \text{cycle segment}} = \qquad (12)$$

$$M_{\text{motor,cycle segment}} - M_{\text{friction,cycle segment}} - J \cdot \frac{d\omega, \text{cycle segment}}{dt}.$$

The parameter $M_{BSD}$ refers to the moment acting on the BSD in the respective cycle segment, the parameter $M_{\text{friction}}$ refers to the moment acting in the drive train in the respective cycle segment, likewise expressed in [Nm], and J refers to the mass moment of inertia in the drive train.

In the prestressing classes 3%, 5%, 8%, and 10%, it is possible to distinguish between the following two cases for determining the load (at 0% and 2% prestressing force, there is only the load instance b described below). In the first instance (a), the external load $F_{\text{external}}$ is less than or equal to the buckling point force $F_K$ (2.828×$F_V$); $F_V$ is the prestressing force and results from the prestressing in [%]/100× the dynamic load rating C, expressed in [N]. This yields a total load $F_{tot}$ for the BSD in a cycle segment in accordance with the following formula:

$$F_{tot} = \left( \frac{|F_{\text{external}}|}{2.828 \times F_V} + 1 \right)^{\frac{3}{2}} \times F_V. \qquad (13)$$

where $F_{tot}$ refers to the total load on the ball screw drive in the respective time segment, expressed in [N], $F_{\text{external}}$ refers to the external load (depending on the amount) on the ball screw drive in the respective time segment, expressed in [N], and $F_V$ refers to the prestressing force.

For the instance in which the external force is greater than the buckling point force, the total load is calculated in accordance with the following formula:

$$F_{tot} = |F_{\text{external}}| \qquad (14).$$

This case should, however, be avoided since the prestressing force can cause a sliding of the roller elements to occur and this can result in a premature failure.

In the context of the cyclical force determination, it is possible, for example with the above-mentioned formula 11, to determine a force constant and, by means of this force constant and with the aid of the current that is measured by the sensor device, to use the equation $$F_{\text{external}} = F_K \times 1$$

to determine the external force value acting on the BSD. In this case, in a good approximation, the friction and mass moment of inertia can preferably be disregarded.

In the acceleration and deceleration phases, however, the moment that is caused by the mass moment of inertia of the drive train (motor transmission and ball screw drive) should also be taken into account here. Through the input of the threaded spindle data, it is possible to calculate the mass moment of inertia of the ball screw drive; the mass moment of inertia of the motor is also known. A possibly provided transmission can be disregarded or can also be additionally input. Since the drive regulating device or the processor device 8, respectively, has knowledge about the acceleration phases, these values can also be taken into consideration in the calculation of the force values.

At time intervals that have yet to be defined, the equivalent dynamic force and therefore the remaining life expectancy can be respectively calculated. With the knowledge of the force value $F_K$, it is then possible to calculate the force value $Z_n \ast u_{tot}$ through the use of formula 6, making use of the above-mentioned relation between the current and $F_K$. The total number of executed rotations $u_{tot}$ is calculated through the use of formula 5. The average speed Nm is calculated, once again taking into account the individual speeds measured in the respective time segments and also taking into account a possibly provided transmission. If the individual data are known, then with the aid of the above-mentioned formulas, the force equivalent can be calculated and therefore also the new theoretically calculated life expectancy LH, 10. Preferably, as soon as the value of the remaining life expectancy becomes negative, a warning can be generated in the drive unit. This warning notifies the user that the life expectancy, which was calculated based on the real load, has elapsed and that the SD should be checked for wear.

As mentioned above, the life expectancy determination for SDs described here can also be modified and broadened to include linear guides that can detect their load state and send messages to the control unit. Preferably, data such as the permissible axial spindle load $F_K$ (buckling), a critical speed, a short stroke, and an overload prevention, i.e. $F_{max} < 0.25$ Co can also be taken into account.

All of the defining characteristics disclosed in the application documents are claimed as essential to the invention to the extent that they are novel in relation to the prior art, individually or in combination with one another.

REFERENCE NUMERAL LIST 2 screw drive
2a threaded spindle
2b traveling nut
4 servo motor
5 memory unit
6 transmission
8 processor device
10 sensor device
12 clutch unit
14 feedback cable
16 power cable
F1 processing force
P1, P2 arrows

What is claimed is:

1. A method for determining a life expectancy of a machine component (2) during operation, comprising the following steps:
    establishing characteristic data in order to determine the life expectancy for the machine component (2), wherein said characteristic data are selected from a group consisting of a dynamic load rating, a static load rating, a maximum speed, a spindle pitch, a spindle length, and a prestressing class, or any combination thereof;
    providing a sensor device (10);
    determining loads acting on the machine component during operation by means of the sensor device (10);
    determining characteristic values that are characteristic for the loads acting on the machine component, said characteristic values including current values and torque values; and
    determining the life expectancy of the machine component based on the characteristic values and on the characteristic data for the machine component.

2. The method as recited in claim 1, wherein the life expectancy is a remaining life expectancy that is determined taking into account the portion of the machine component (2) service life that has already elapsed.

3. The method as recited in claim 1, wherein the life expectancy of the machine component (2) is determined repeatedly, at various times.

4. The method as recited in claim 1, wherein a life expectancy determined at an earlier point in time t1 is taken into account in the determination of a life expectancy at a predetermined later point in time.

5. The method as recited in claim 1, wherein the characteristic data for the machine component (2) are determined upon initial operation of the machine component.

6. The method as recited in claim 1, wherein the loads acting on the machine component (2) are mechanical loads of the machine component.

7. The method as recited in claim 1, wherein the machine components (2) are taken from a group of machine components that includes bearings, ball screw drives, guides, in particular linear guides, and the like.

8. The method as recited in claim 1, wherein the characteristic data for the machine component (2) are stored in a drive control unit of the machine.

9. A device for determining a life expectancy of machine components (2), comprising:
- a memory unit (5), wherein characteristic data for the relevant machine component are stored), wherein said characteristic data are selected from a group consisting of a dynamic load rating, a static load rating, a maximum speed, a spindle pitch, a spindle length, and a prestressing class, or any combination thereof;
- a processor device (8), wherein said processor device is configured to calculate the life expectancy of the machine component based on the characteristic data stored in the memory unit (5); and
- a sensor device (10), wherein said sensor device (10) is configured to determine a characteristic value for a load acting on the machine component (2) during operation and to output a characteristic value that is characteristic for this load, said characteristic value being selected from a group consisting of a current value and a torque value, or both, wherein the processor device (8) is configured to determine the life expectancy of the machine components (2) by taking into account said characteristic value.

10. The device as recited in claim 9, wherein the processor device (8) is embodied so that when determining the life expectancy, the processor device (8) also takes into account a portion of the machine component service life that has already elapsed.

11. A guide carriage, comprising:
- a device for determining a life expectancy of machine components (2), said device comprising a memory unit (5), wherein characteristic data for the relevant machine component are stored), wherein said characteristic data are selected from a group consisting of a dynamic load rating, a static load rating, a maximum speed, a spindle pitch, a spindle length, and a prestressing class, or any combination thereof;
- a processor device (8), wherein said processor device is configured to calculate the life expectancy of the machine component based on the characteristic data stored in the memory unit (5); and
- a sensor device (10), wherein said sensor device (10) is configured to determine a characteristic value for a load acting on the machine component (2) during operation and to output a characteristic value that is characteristic for this load, said characteristic value being selected from a group consisting of a current value and a torque value, or both, wherein the processor device (8) is configured to determine the life expectancy of the machine components (2) by taking into account said characteristic value.

* * * * *